Aug. 20, 1935.  F. H. SCHOENFELD  2,011,691
THERMOSTAT MECHANISM
Filed March 8, 1934   2 Sheets-Sheet 1
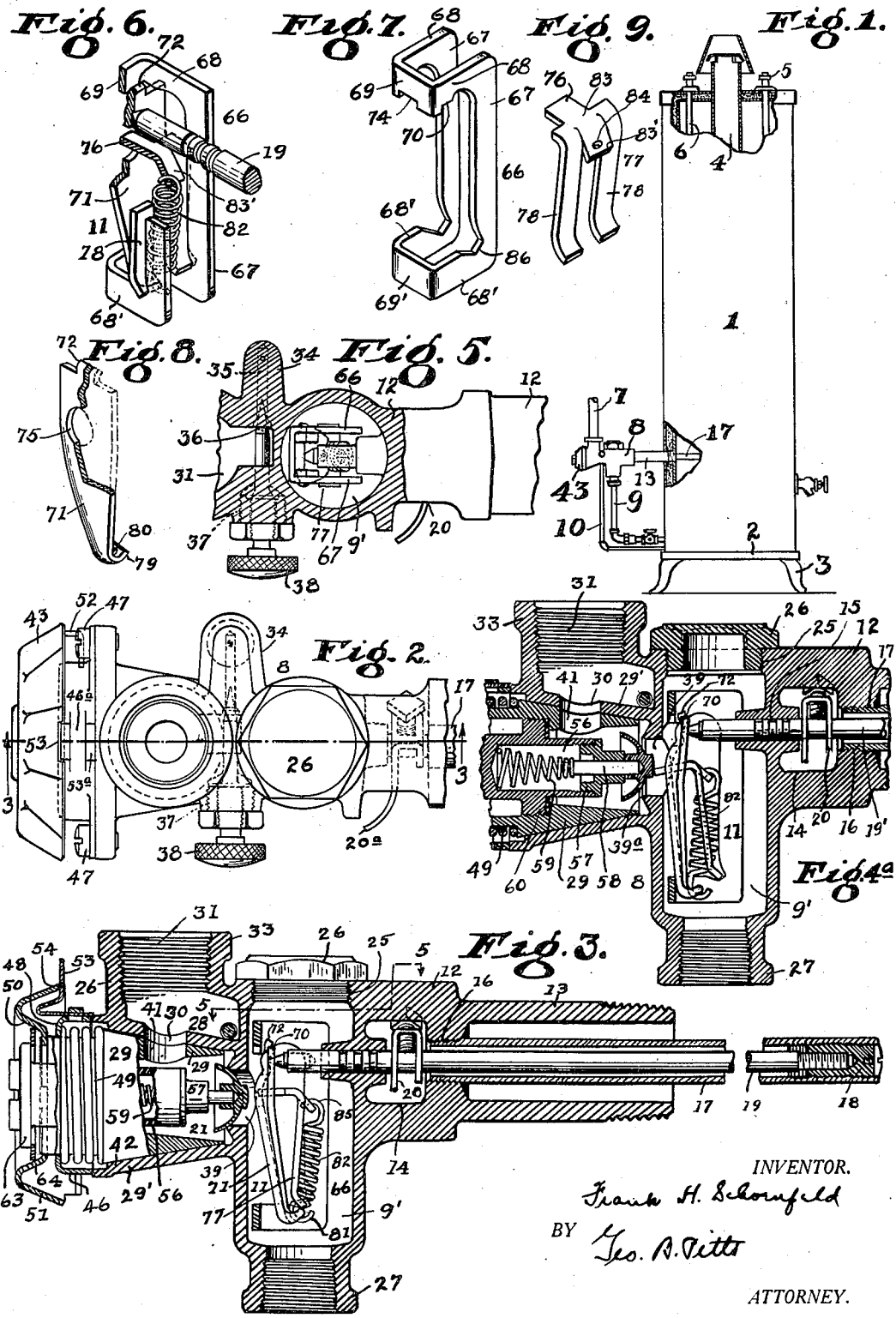
INVENTOR.
Frank H. Schoenfeld
BY Geo. A. Pitts
ATTORNEY.

Aug. 20, 1935.  F. H. SCHOENFELD  2,011,691
THERMOSTAT MECHANISM
Filed March 8, 1934  2 Sheets-Sheet 2
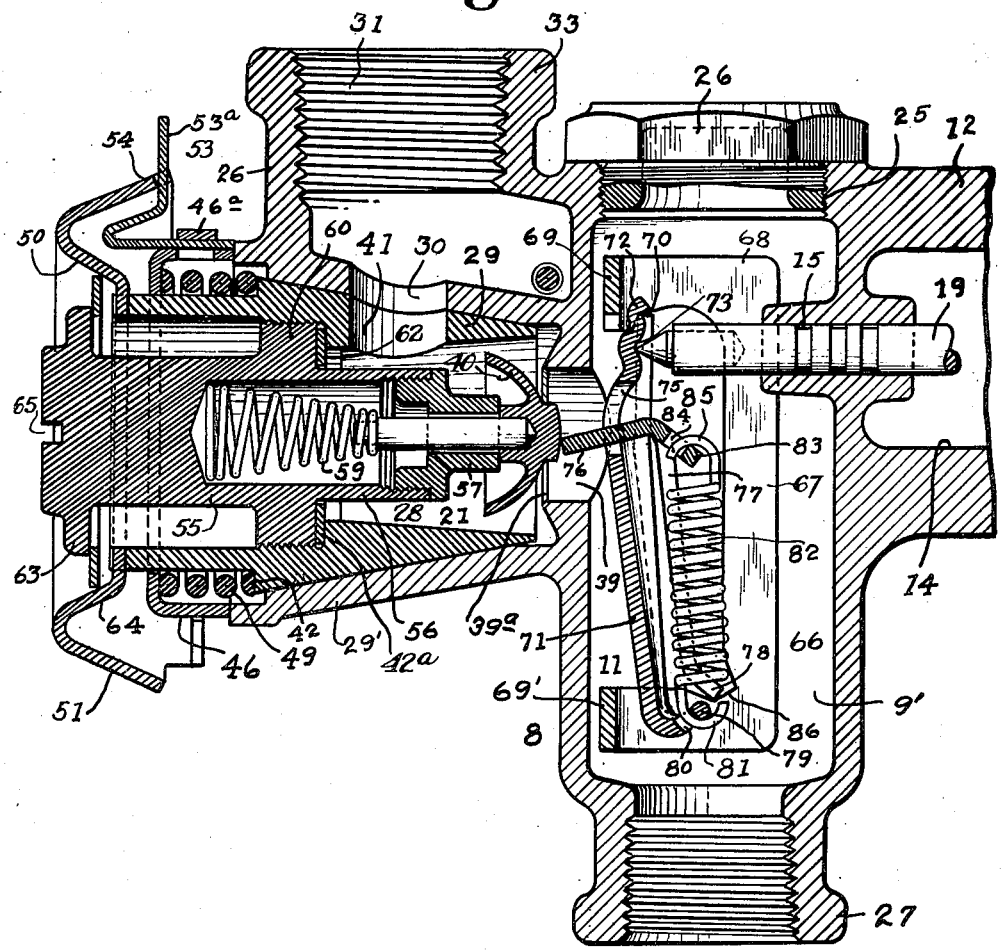
INVENTOR.
Frank H. Schoenfeld
BY Geo. B. Pitts
ATTORNEY.

Patented Aug. 20, 1935

2,011,691

UNITED STATES PATENT OFFICE 2,011,691

THERMOSTAT MECHANISM

Frank H. Schoenfeld, Cleveland Heights, Ohio assignor to The Titan Valve and Manufacturing Company, Cleveland, Ohio, a corporation Application March 8, 1934, Serial No. 714,682

16 Claims. (Cl. 236—33)

This invention relates to a thermostatically controlled fluid supply means for a fluid heater, such as a storage water heater, more particularly to the operating leverage between the thermostat elements and the fuel inlet valve and the mounting for the leverage.

One object of the invention is to provide an improved snap action, multi-leverage thermostat mechanism in which all of the levers are mounted on a support and one lever, by the normal action of the leverage spring, is held against the movable thermostatic element, so that such element, acting through the leverage, maintains the support in fixed position in the thermostat casing to insure uniform operations of the leverage at all times with minimum change in temperature of the medium in contact with the thermostatic elements.

Another object of the invention is to provide an improved thermostatically operated, snap action leverage and mounting therefor, so constructed and arranged that the leverage may be assembled ready for insertion in its casing and positioned and removed therefrom as a unit.

Another object of the invention is to provide an improved thermostatically operated, snap action leverage and support therefor so constructed that bearings, shafts and pivots mounted in or upon the walls of the casing for the leverage are eliminated.

Another object of the invention is to provide an improved thermostatically operated leverage of a simplified, compact construction, whereby its enclosing casing may be made relatively small in size and economical in construction.

A further object of the invention is to provide an improved mounting for a multi-leverage of a thermostatic mechanism, capable of supporting the levers independently of the leverage casing, whereby the latter may be readily constructed.

A further object of the invention is to provide an improved thermostatically operated, snap action leverage and mounting therefor so arranged that one lever co-acts with one of the thermostat elements to maintain the mounting in position in its casing, thereby insuring at all times an operative relation between the thermostat element and the leverage and effective response to slight changes in temperature of the medium surrounding the thermostatic elements.

Other objects of the invention will be apparent to those skilled in the art to which my invention relates from the following description taken in connection with the accompanying drawings, wherein Fig. 1 is an elevation of a storage heater for water provided with a thermostat mechanism embodying my invention.

Fig. 2 is a plan view of the thermostat mechanism, parts being broken away.

Fig. 3 is a section on the line 3—3 of Fig. 2 showing the position of the parts when the water in the tank has been heated to the desired temperature.

Fig. 4 is an enlarged fragmentary section showing the position of the parts when the thermostat has operated to open the fuel supply valve.

Fig. 4a is a fragmentary view substantially similar to Fig. 4 but showing the position of the parts in position due to lowering of the temperature in the container to an abnormal low temperature.

Fig. 5 is a fragmentary section on the line 5—5 of Fig. 3.

Fig. 6 is a fragmentary perspective view of the leverage and its mounting, parts being broken away.

Figs. 7, 8, and 9 are detail views of certain of the parts shown in Fig. 6.

In the drawings, 1 indicates a storage water heater comprising an insulated tank, the burner for a gaseous fuel being below the tank and mounted in a casing incorporated with the insulation for the tank and forming a combustion chamber, the casing being secured to a ring 2 having suitable feet 3. 4 indicates a flue which leads through the tank from the combustion chamber. 5 indicates the outlet for hot water, leading to service points or stations. 6 indicates the water supply pipe leading from the supply mains. The parts above described form no part of my invention and may be of any preferred construction and arrangement.

The gaseous fuel is supplied by a pipe 7 to a casing 8, to be later referred to, and from the casing through a pipe 9 to the burner and through a pipe 10 to a suitable pilot. The pipe 7, casing 8 and pipe 9 form a conduit for the fuel leading to the burner. The casing 8 is shaped to form a chamber 9' in which is removably mounted a leverage, indicated as an entirety at 11, to be later referred to. The rear wall of the casing is provided with an integral boss or body member 12, which is in turn provided with a tubular member 13. The free end of the member 13 is threaded into the side wall of the tank 1, as shown in Fig. 1. The body portion 12 is formed with a recess 14 which extends inwardly from one side thereof. The side walls of the recess 14 are formed with openings 15, 16, in axial alinement with the tubular member 13. The walls of the opening 16 are threaded to receive and support the inner end of a tube 17 formed of copper or other material having a high co-efficient of expansion to serve as one thermostatic element. The tube 17 extends through the member 13 into the tank 1 and its outer end is closed in a liquid tight manner by a plug 18 (preferably a plug threaded into the tube). The plug 18 is formed with a threaded opening, extending axially inwardly from its inner end, and arranged to receive the outer, threaded end of a rod 19, formed of invar metal or other material having a low co-efficient of expansion to serve as the other thermostatic element. The rod 19 extends through the tube 17 and opening 15 into the chamber 9' for engagement with and operation of the leverage 11. 20 indicates a device connected to the rod 19 within the recess 14 and extending outwardly to a point of access, as shown at 20a. The device 20 serves as a means for rotating the rod 19, which operation through the threaded connection with the plug 18 will move the rod 19 endwise and effect an adjustment between it and the leverage 11, so that movement of the rod 19 will actuate the leverage with greater or lesser change in temperature of the water, to control a valve 21 to be later referred to.

In the structural form of the casing shown, the top wall of the chamber 9' is formed with a threaded opening 25, closed by a plug 26, and its bottom wall is provided with a nipple 27 to which the pipe 9 is connected.

The conduit for the combustible fluid is shown controlled by a dual valve mechanism comprising a main valve 28 and a controlling valve 21 (already referred to) which is operated by the leverage 11. The main valve 28 consists of a rotary valve element 29 which opens and closes a port 30 formed in a wall 29' and leading from an inlet chamber 31. The wall 29' and wall of the inlet chamber 31 are preferably formed integrally with each other and the casing 8. The wall of the chamber 31 terminates in a suitable nipple 33 to which the pipe 7 is connected. By the provision of the chamber 31, provision is made for a valved outlet connected to the pilot pipe 10. For this latter purpose, the wall of the chamber 31 is provided at one side with an integral boss 34 having an opening 35 through it, the pipe 10 being suitably fixed in the outer end of the opening 35, its inner end forming a seat for a needle valve 36. The needle valve 36 has a threaded shank threaded in and extending through a plug 37 mounted in the wall at the opposite side of the chamber 31 and a head 38 for turning the valve. The wall 29' is concentric to an opening 39 formed in the outer wall of the chamber 9'. The wall surrounding the opening 39 forms a valve seat, as shown at 39a for the valve 21. The valve element 29 is open from end to removably receive the valve element 40 of the valve 21 and its mounting and is formed with a port 41 which registers with the port 30 in one position of the valve element 29 to permit the fuel to flow from the inlet chamber 31 through the valve element 29 and through the chamber 9', from which the fuel flows through the pipe 9 to the burner. The valve element 29 may be rotated any desired distance, to close the port 30, by a handle 43, but in the preferred arrangement the removal of the valve element 40 and its mounting serves to rotate the valve element 29 and close the port 30 and replacement of these parts serves to rotate the valve element 29 and open the port 30. The outer end portion of the valve element 29 is reduced to form an annular exterior shoulder 42 and an annular interior shoulder 42a for purposes later set forth. The outer end of the element 29 carries the handle 43 by which the element may be rotated manually or automatically as hereinafter described, the handle being of annular shape to permit the removal and replacement of the valve element 40 and its mounting, and may be secured to the valve element 29 in any desired manner. 46 indicates a collar preferably formed of sheet metal and removably secured to the outer end of the wall 29'. As shown, the collar 46 and wall 29' are provided with diametrically arranged outwardly extending lugs having alined openings to receive screws 47, which secure the collar 46 in position. The outer end of the collar 46 is provided with an in-turned flange 48 which forms the seat or abutment for one end of coiled spring 49, the other end of the spring engaging the shoulder 42 and normally tending to move the valve element 29 inwardly to maintain it in its seat. The handle 43 is preferably formed of sheet metal and shaped to form an inner annular, outwardly flaring wall 50 and an inwardly extending skirt 51, the latter being of non-circular formation to facilitate gripping thereof when turned manually. The skirt 51 is provided with in-turned members 52 (one only being shown) so arranged that one member engages the head of one screw 47 and the other member engages the head of the other screw 47, whereby these screws serve as stops to limit the rotative movement of the handle 43 and valve element 29. The members 52 are preferably arranged so that the valve element may rotate a quarter turn and in the opening movement thereof it is stopped by the adjacent screw 47 at the point where the ports 30 and 41 are in registry. The handle 43 may be locked in either position as limited by the screws 47 by means of a spring catch 53 arranged to enter slots 54 formed in the rim or edge of the skirt 51. The latch 53 consists of a resilient strip having a base portion suitably secured to the collar 46 and a portion 53a extending radially therefrom and arranged to ride on the skirt rim and enter one of the slots as shown in Fig. 3. The portion 53a extends beyond the handle 43 so that it may be manually pressed inwardly to release the handle. The strip 53 may be secured to the collar 46 by slitting the latter on parallel lines throughout a portion of its circumference to form between the slits a section 46a. This section is distended or flexed sufficiently to permit the base portion of the strip to be inserted below it and thus engage with the collar at opposite sides of the section 46a. As the opening through valve element 29 is sealed by the mounting for the valve element 40, as later set forth, no danger of leakage through the slits is present. The mounting for the valve element 40 consists of a member 55 provided with a collar 60 having threaded engagement with the inner wall of the valve element 29 (see Fig. 4). By means of a suitable gasket 62, which is compressed by the collar 60 into engagement with a shoulder 42a, the opening through the element 29 is gas-tight sealed. When the collar 60 is screwed into position against the shoulder 42a, the closing member is rigidly secured to the valve element 29 and may rotate therewith when turned. By releasing the spring latch 53a, the valve element 29 may be turned to close the port 39 or open it. The closing member 55 is hollowed out axially from its inner end to form a chamber 56. The outer end of the chamber 56 is closed by a plug 57 preferably threaded to the internal wall of the chamber 56. The plug 57 is formed with a through axial opening which forms a guide for a shank 58 fixed at its inner end to the valve element 40. The outer end of the shank 58 engages with the adjacent end of a coiled spring 59 (being preferably fixed thereto), the opposite end of the spring engaging the end wall of the chamber 56. The spring 59 normally tends to move the valve element against its seat 39a, but is compressed when the valve element 40 is unseated by movement of the leverage 11 toward the left, as shown in Fig. 3. The outer end of the closing member 55 is provided with a flange or collar 63 the diameter of which is somewhat larger than that of the collar 60 to permit the positioning over the latter of a ring 64. The ring 64 is preferably slightly resilient and is arranged to be pressed into tight frictional engagement with the handle wall 50 when the member 55 is screwed into final position. Accordingly, when the closing member 55 is rotated in the operation of removing it, the engagement of the ring 64 with the wall 50 will serve to turn the handle 43 and valve element 29 until the handle is stopped by the engagement of one lug 52 with the adjacent screw 47, thereby closing the port 30; likewise, in the replacement of the closing member 55, the ring 64 will be forced into tight engagement with the wall 50 and operate to turn it until it is stopped by the engagement of the other lug 52 with the adjacent screw 47. If desired, the ring 64 and handle wall 50 may be provided with interlocking elements. From the foregoing description it will be seen that the closing member 55 is detachably connected to the handle 43 so that when the member is turned in one direction to remove it, it automatically turns the handle and valve element to close the main valve port 30 and releases itself from the handle; and that when the closing member is replaced and turned to position it in the valve element, the handle is engaged and automatically turned to open the valve port 30. It will also be seen that when it is desired to inspect, clean or repair the elements of the closing valve, the single operation of unscrewing the closing member, removes the valve element 40 and closes the port 30 and that but one operation is required to replace the valve element 40 and open the port 30. The outer end of the closing member 55 is preferably provided with a kerf 65 to receive a tool to facilitate turning of the member.

The valve element 40 is preferably of substantially semi-spherical shape and its seat 39a is correspondingly ground.

It will be noted that in my construction the valve element for the controlling valve 21 is mounted upon or in the closing member 55 and operates therein independently of the valve element 29. Accordingly, the closing member serves as a removable mounting for the valve element, whereby the latter may be removed and cleaned when desired; and when the member is removed, the valve seat 39a is accessible for cleaning.

The dual valve mechanism or parts thereof form the subjects-matter of a co-pending application filed by me on March 7, 1934, Ser. No. 714,472, for which reason no claim is made thereto herein.

It will be understood that any desired form of valve mechanism may be used in connection with my improved thermostat mechanism, the mechanism herein shown being merely for illustrative purposes.

The leverage 11 comprises the following: 66 indicates as an entirety a frame removably mounted in the chamber 9' and held against the front wall thereof by the thermostatic element 19, as later set forth.

The frame 66 is formed from a section of sheet metal bent on longitudinal lines into substantially U-shape to provide spaced side members 67, having at their upper and lower ends spaced lateral arms 68, 68', and upper and lower cross bars 69, 69', each side member 67 and adjacent arms 68, 68', being in the same plane and parallel to the other side member and adjacent arms. The front wall of the chamber 9' is engaged by the opposite ends of the cross members 69, 69', as shown in Fig. 5, above and below the valve opening 39a therein. The upper lateral arms 68 are cut away on their inner edges to form angled corners 70 in which seats the upper end of a main lever 71, such end being cut away at its opposite sides to provide an upwardly extending lip 72 and the cut-aways being machined to form inwardly beveled edges, which provide knife-edge bearings for the lever. The lip 72 is arranged between the arms 68 to prevent lateral movement of the lever 71 relative thereto. Below the lip 72 the lever 71 is provided with a central recess 73 (preferably constituting a depression in the metal) which forms a seat for the pointed free end of the thermostatic element 19. Where the lever 71 is formed with a depression to provide the seat 73, the lower edge of the cross member 69 is cut away as shown at 74 to accommodate such depression. Below the seat 73, the lever 71 is formed with an opening 75 through which the valve engaging device 76, provided on a secondary lever 77, operates, as later set forth. The lever 71 extends downwardly to a point within the lateral arms 68' to provide maximum length and its sides are preferably of converging shape toward its lower end, so that such end is free to move between and relative to the spaced legs 78 of the lever 77. The lower end of the lever 71 terminates in a laterally extending tail 79. The tail 79 is formed with an opening 80 so that the hook 81 on the end of an extension spring 82 may extend through the opening and connect the spring to the tail 79. The lever 77 comprises the legs 78 disposed in parallel relation and connected at their upper ends by a cross member 83 to which is centrally connected the valve operating member 76 and a rearwardly depending lug 83' the purpose of which will be later set forth. The member 76 extends at substantially right angles to the lever 77 and operates through the opening 75 to engage the valve element 40, as shown in Fig. 4. The lower ends of the lever legs 78 are bent rearwardly so that their forward transverse edges may make knife edge contact in angle walls 86 provided on the lateral arms 68'. The legs 78 of the lever 77 extend beyond the frame side members 67 (see Figs. 5 and 6) to limit the movement of the lever rearwardly. The movement of the lever 77 in the opposite direction is limited by the engagement of the cross bar 83 with the lever 71 (see Fig. 4). The lug 83' is formed with an opening 84, through which extends the hook 85 on the opposite end of the spring 82, the spring serving to connect the outer end portions of the levers together and to also (a) normally bias the main lever about its fulcrum in opposition to the thrust movement of the thermostatic element 19 and (b) effect snap action of the secondary lever in opposite directions, as later described.

In this arrangement, the thermostatic rod 19 operates through the leverage 11 to support it and the frame 66 in a predetermined position in the chamber 9'. As the rod 19 is slidably as well as rotatively supported in the opening 15 and its free end fits into a seat in the lever 71, the rod 19, lever 71 and fulcrum for the latter are maintained in the same relation at all times and permit accurate control of the valve 21 to be made by the rotative adjustment of the rod 19. As snap action of the lever is effected by a small movement of the lever 71, the valve 21 will be opened or closed as a result of slight change in temperature of the surrounding water in the tank 1.

*Operation.*—Fig. 3 shows the position of the leverage 11 (which position may be termed normal) when the water in the tank 1 is heated to the predetermined temperature. In this position, an imaginary line cutting the connection of the spring 82 with the levers 71, 77, lies in an off-center position inwardly of the fulcrum or axis of the latter lever; accordingly, the spring 82, which is under tension, maintains the lever 71 against the side members 67 of the frame 66. If, due to the use of the heated water and supply of cold water to the tank, or otherwise, the temperature of the surrounding water becomes lowered, the contraction of the tube 17 moves the rod 19 endwise, which in turn will move the lower end of the spring 82 outwardly, the effect of which is to swing the spring relative to the fulcrum or axis of the lever, so that the said imaginary line lies in an off-center position outwardly of said lever fulcrum. Upon movement of the spring 82 to this latter position, it will impart a snap action movement to the lever 77 and thus open the valve 21, against its spring, as shown in Fig. 4, and permit the combustible fuel to flow into and through the casing 8 to the burner. Upon reheating of the water, the rod 19 will move endwise and permit the lever 71 to move to its normal position, in which movement the lever 77 will be snap operated rearwardly and permit the valve element 40 to re-seat and close the opening 39. If, following the operation of the leverage 11 to the Fig. 4 position, the temperature of the water continues to drop, the contraction of the tube 17 will move endwise toward the left the rod 19 which in turn will swing the lever 71 about its fulcrum to accommodate such movement of the rod, as shown in Fig. 4a. As the lever 77, in this further movement of the lever 71, is held in engagement therewith by the spring 82, it moves therewith and through the member 76 moves the valve element 40 away from its seat a greater distance. This operation of the valve will admit more gas to the burner unless the valve 9x has been adjusted to a predetermined flow of fuel.

From the foregoing description it will be noted that both the main or thermostatic element engaging lever 71 and the secondary or valve operating lever 77 are fulcrumed on spaced knife edge bearing points, that the spring 82 is centrally connected to these levers in a plane between such bearing points and that the engagement of the thermostatic element 19 with the lever 71 and engagement of the lever 77 with the valve element 40 are in this same plane. It will also be noted that the levers 71, 71, are arranged in side by side relation and fulcrumed on the frame at their respective remote ends, so that the spring 82 being connected to their free end portions serves to maintain the levers in engagement with their knife-edge bearings. Furthermore, in all positions of the levers, the spring normally tends to swing the lever 71 toward the rod 19 to maintain engagement therewith.

To those skilled in the art to which my invention relates, many changes in construction and widely differing embodiments and applications of the invention will suggest themselves without departing from the spirit thereof. My disclosures and the description herein are purely illustrative and are intended to be in no sense limiting.

What I claim is:

1. In a thermostat mechanism, the combination with a casing forming a chamber and provided with an outlet leading therefrom and a valve for controlling the flow of a fluid into said chamber, of a frame removably mounted in said chamber, a leverage, including a spring for effecting snap action of the lever which operates said valve, mounted in said frame, and a thermostatic element extending into said chamber and engaging another lever of said leverage to operate the latter and operating through said leverage to maintain said frame in position.

2. In a thermostat mechanism, the combination with a casing forming a chamber and provided with an outlet leading therefrom, a valve for controlling the flow of a fluid into said chamber and a thermostatic element, of a frame removably mounted in said chamber, a leverage, including a spring for effecting snap action of the lever which operates said valve, mounted in said frame, said element being in engagement with one of said levers and operating through the leverage to support the frame in position in said chamber.

3. In a thermostat mechanism, the combination with a casing forming a chamber and provided with an outlet leading therefrom, a valve for controlling the flow of a fluid into said chamber and a thermostatic element, of a frame removably mounted in said chamber and comprising a pair of spaced side members having at its opposite ends laterally extending connected portions forming pairs of spaced supports, a lever having fulcrum engagement with one pair of said supports and arranged to be operated by said thermostatic element, a lever having fulcrum engagement with said other pair of supports and arranged to operate said valve, a spring connecting the end portions of said levers, the movement of said first mentioned lever serving to move said spring relative to the fulcrum of the other lever, whereby the latter is snap operated, and a cover for said chamber removable independently of said frame.

4. In a thermostat mechanism, the combination with a casing forming a chamber and provided with an outlet leading therefrom, a valve for controlling the flow of a fluid into said chamber and a thermostatic element, of a frame comprising a pair of spaced side members having upper and lower lateral arms, a cross bar connecting the upper arms together and provided with a pair of spaced bearing edges, a lever having fulcrum engagement with said bearing edges and arranged to be operated by said thermostatic element, a lever having fulcrum engagement with said lower arms and arranged to operate said valve, and a spring connecting the end portions of said levers, the movement of said first mentioned lever serving to move said spring relative to the fulcrum of the other lever, whereby the latter is snap operated.

5. In a thermostat mechanism, the combination with a casing forming a chamber and provided with an outlet leading therefrom, a valve for controlling the flow of a fluid into said chamber and a thermostatic element, of a frame mounted in said chamber and comprising a pair of spaced side members having lateral arms at their upper and lower ends, a lever for operating said valve, said lever having a pair of spaced legs fulcrumed at their lower ends on said lower arms, a lever engaged by said thermostatic element and fulcrumed at its opposite sides on said upper arms, and a spring connecting the free ends of said levers and disposed in the plane between the legs of said first mentioned lever, the free end of the last mentioned lever being movable in said plane and operable to position said spring for exerting tension on said first mentioned lever along an imaginary line at either side of the lever fulcrum, whereby movement of said last mentioned lever will cause said spring to operate said first mentioned lever with snap action in either direction.

6. In a thermostat mechanism, the combination with a casing forming a chamber and provided with an outlet leading therefrom, a valve for controlling the flow of a fluid into said chamber and a thermostatic element, of a frame mounted in said chamber and comprising a pair of spaced side members having lateral arms at their upper and lower ends, a main lever fulcrumed at its upper end on said upper arms and arranged to be engaged by said thermostatic element and formed intermediate its ends with an opening, a separate lever fulcrumed at its lower end on said lower arms and swingable between said side members and said main lever and provided with a device movable through said opening for engagement with said valve, and a spring connecting the free ends of said levers and normally tending to maintain said levers in engagement with said arms and said main lever in engagement with said thermostatic element, said main lever being operable to position said spring at either side of the fulcrum for said separate lever to effect snap action thereof.

7. In a thermostat mechanism, the combination with a casing forming a chamber and provided with an outlet leading therefrom, a valve for controlling the flow of a fluid into said chamber and a thermostatic element, of a frame mounted in said chamber and comprising a pair of spaced side members having lateral arms at their upper and lower ends, a main lever fulcrumed at its upper end on said upper arms and arranged to be engaged by said thermostatic element and formed intermediate its ends with an opening, a separate lever fulcrumed at its lower end on said lower arms and swingable between said side members and said main lever and provided with a device movable through said opening for engagement with said valve, and a spring connecting the free ends of said levers in a plane between said arms and normally tending to maintain said levers in engagement with said arms and said main lever in engagement with said thermostatic element, said main lever being operable to position said spring at either side of the fulcrum for said separate lever to effect snap action thereof.

8. In a thermostat mechanism, the combination with a casing forming a chamber and provided with an outlet leading therefrom, a valve for controlling the flow of a fluid into said chamber and a thermostatic element, of a frame removably mounted in said chamber, and a leverage, including a spring for effecting in opposite directions snap action of the lever which operates said valve, mounted in said frame, said element being in engagement with one of said levers and operating through the leverage to support the frame in said chamber, said spring serving to maintain said lever in engagement with said element while permitting said element to effect operation of said leverage.

9. In a thermostat mechanism, the combination with a casing forming a chamber and provided with an outlet leading therefrom, a valve for controlling the flow of a fluid into said chamber and a thermostatic element, of a frame comprising a pair of spaced side members having upper and lower laterally extending portions forming pairs of spaced supports, means for connecting the supports of each pair together, a lever having fulcrum engagement with said upper pair of supports and arranged to be operated by said thermostatic element, a lever having fulcrum engagement with said lower pair of supports and arranged to operate said valve, a spring connecting the end portions of said levers, the movement of said first mentioned lever serving to move said spring relative to the fulcrum of the other lever, whereby the latter is snap operated, and a device on one of said levers disposed between the adjacent supports to prevent lateral movement of the lever.

10. In a thermostat mechanism, the combination with a casing forming a chamber and provided with an outlet leading therefrom, a valve for controlling the flow of a fluid into said chamber and a thermostatic element, of a frame removably mounted in said chamber and comprising a pair of spaced side members having upper and lower laterally extending portions forming pairs of spaced supports, levers having knife-edge engagement with said upper and lower supports, respectively, and a spring connecting the end portions of said levers, one of said levers being arranged to be operated by said thermostatic element and the other lever being arranged to operate said valve, the movement of the lever operated by said element serving to move said spring relative to the fulcrum of the valve operating lever, whereby the latter is snap operated.

11. In a thermostat mechanism, the combination with a casing forming a chamber and provided with a port, of a spring operated valve for closing said port, a thermostatic element extending into said chamber, and a leverage in said chamber consisting of a frame within and removably engaging the wall of said chamber, a pair of levers fulcrumed at their remote ends in said frame and a spring for connecting the free ends of said levers together, one of said levers being arranged to unseat said valve and the other lever being engaged by said element and said spring normally acting through said other lever in opposition to said element, whereby the latter supports said frame in said chamber with said valve unseating lever in operative relation to said valve.

12. In a thermostat mechanism, the combination with a casing forming a chamber and provided with a port, of a spring operated valve for closing said port, a thermostatic element extending into said chamber, and a leverage in said chamber comprising a frame, a pair of levers fulcrumed at their remote ends in said frame and a spring for connecting the free ends of said levers together, one of said levers being arranged to unseat said valve and the other lever having operative connection with said element and said spring normally acting through said other lever in opposition to said element, whereby the latter supports said leverage in said chamber in operative relation to said valve, and means for adjusting said element endwise.

13. In a thermostat mechanism, the combination with a casing forming a chamber and provided with an outlet leading therefrom, a valve for controlling the flow of a fluid into said chamber and a thermostatic element, of a frame comprising a pair of spaced side members having upper and lower laterally extending portions forming pairs of spaced supports and cross bars connecting the outer ends of the respective portions together, a lever having a fulcrum engagement with said upper pair of supports and arranged to be operated by said thermostatic element, a lever having fulcrum engagement with said lower pair of supports and arranged to operate said valve, and a spring connecting the end portions of said levers, the movement of said first mentioned lever serving to move said spring relative to the fulcrum of the other lever, whereby the latter is snap operated, the cross bar for the lower pair of laterally extending portions forming a stop for the first mentioned lever and said side members forming a stop for the last mentioned lever.

14. A frame for supporting a leverage within a chamber and formed of a single section of sheet metal and comprising spaced parallel side members having at their opposite ends pairs of laterally extending parallel arms, each pair being connected at their outer ends by a cross member, the inner edges of the upper arms adjacent their outer ends and the inner edges of the lower arms adjacent their inner ends having angularly related portions adapted to form fulcrums for related levers.

15. In a valve mechanism, the combination with a casing having a fluid outlet, a thermostat mechanism associated with said casing, a leverage in said casing arranged to be operated by said thermostat mechanism, one wall of said casing being formed with a valve opening, a wall in concentric relation to said opening and formed with a valve port, a rotary valve element seated in said wall for opening and closing said port, a member removably mounted in said valve element, and a valve element movably mounted in said rotary valve element for controlling said valve opening and arranged to be operated by said leverage.

16. In a valve mechanism, the combination with a casing having a fluid outlet, a thermostat mechanism associated with said casing, a leverage in said casing arranged to be operated by said thermostat mechanism, one wall of said casing being formed with a valve opening, a wall in concentric relation to said opening and formed with a valve port, a rotary valve element seated in said wall for opening and closing said port, a member removably mounted in said valve element, and a valve element movably mounted in said rotary valve element for controlling said valve opening and arranged to be operated by said leverage, and means for operating said rotary valve element independently of said other valve element.

FRANK H. SCHOENFELD.

CERTIFICATE OF CORRECTION.

Patent No. 2,011,691. August 20, 1935.

FRANK H. SCHOENFELD.

It is hereby certified that error appears in the printed specification of the above numbered patent requiring correction as follows: Page 2, second column, line 19, after "of" insert the article a; and page 5, first column, lines 39 and 62, claims 6 and 7 respectively, strike out the words "and said main lever"; and second column, line 9, claim 8, after "chambers" strike out the comma and insert the word and; and that the said Letters Patent should be read with these corrections therein that the same may conform to the record of the case in the Patent Office.

Signed and sealed this 24th day of September, A. D. 1935.

Leslie Frazer (Seal) Acting Commissioner of Patents.